(12) United States Patent
Luo

(10) Patent No.: US 7,171,058 B2
(45) Date of Patent: Jan. 30, 2007

(54) METHOD AND COMPUTER PROGRAM PRODUCT FOR PRODUCING AN IMAGE OF A DESIRED ASPECT RATIO

(75) Inventor: Jiebo Luo, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 659 days.

(21) Appl. No.: 10/631,094

(22) Filed: Jul. 31, 2003

(65) Prior Publication Data

US 2005/0025387 A1    Feb. 3, 2005

(51) Int. Cl.
G06K 9/32    (2006.01)
H04N 1/387    (2006.01)

(52) U.S. Cl. ........................... 382/298; 358/453

(58) Field of Classification Search ............... 382/203, 382/282, 173, 180, 298; 358/1.18, 453; 345/620
See application file for complete search history.

(56) References Cited

U.S. PATENT DOCUMENTS

| | | | | |
|---|---|---|---|---|
| 5,901,245 | A | 5/1999 | Warnick et al. | 382/190 |
| 5,978,519 | A | 11/1999 | Bollman et al. | 382/282 |
| 6,282,317 | B1 | 8/2001 | Luo et al. | 382/203 |
| 6,545,743 | B1 | 4/2003 | Luo et al. | 355/18 |
| 6,654,506 | B1 * | 11/2003 | Luo et al. | 382/282 |
| 6,654,507 | B2 * | 11/2003 | Luo | 382/282 |
| 2004/0239982 | A1 * | 12/2004 | Gignac | 358/1.15 |

FOREIGN PATENT DOCUMENTS

| | | |
|---|---|---|
| EP | 1 017 019 | 7/2000 |
| EP | 1 158 464 | 11/2001 |
| EP | 1 215 626 | 6/2002 |

OTHER PUBLICATIONS

U.S. Appl. No. 09/490,915, filed Jan. 25, 2000, Jiebo Luo et al.
"Color image quantization based on physics and psychophysics" by Lee. Journal of Society of Photographic Science and Technology of Japan, vol. 59, No. 1, pp. 212-225, 1996.
"Robust Real-time Object Detection" by Paul Viola and Michael Jones. Proceedings of ICCV 2001 Workshop on Statistical and Computation Theories of Vision.
Viola P et al:, "Rapid Object Detection Using A Boosted Cascade of Simple Features", Dec. 8, 2001, Proceedings 2001 IEEE Conference on Computer Vision and Pattern Recognition, pp. 511-518, XP010583787, ISBN: 0-7695-1272-0.

* cited by examiner

*Primary Examiner*—Kanjibhai Patel
(74) *Attorney, Agent, or Firm*—David M. Woods

(57) ABSTRACT

A method for producing a new image of a desired aspect ratio from an original digital image comprises the steps of: (a) determining a cropping window of the desired aspect ratio and a predetermined size; (b) obtaining a main subject belief map including an array of belief values indicating the location and relative importance of subject matter in the original digital image; (c) using the main subject belief map, determining a location of the cropping window in the original digital image that satisfies a predetermined set of criteria; and (d) producing a cropped image of the desired aspect ratio.

21 Claims, 9 Drawing Sheets

METHOD AND COMPUTER PROGRAM PRODUCT FOR PRODUCING AN IMAGE OF A DESIRED ASPECT RATIO

CROSS REFERENCE TO RELATED APPLICATIONS

Reference is made to commonly assigned U.S. patent application Ser. No. 09/490,915 filed Jan. 25, 2000 entitled "Method for Automatically Creating Cropped and Zoomed Versions of Photographic Images" by Jiebo Luo et al., and U.S. patent application Ser. No. 09/575,784 (which issued as U.S. Pat. No. 6,545,743 on Apr. 8, 2003), entitled "Producing an Image of a Portion of a Photographic Image onto a Receiver using a Digital Image of the Photographic Image" by Jiebo Luo et al., the disclosures of which are incorporated herein by reference.

FIELD OF THE INVENTION

The present invention is related to image processing, and in particular to image cropping for producing an image of a desired aspect ratio.

BACKGROUND OF THE INVENTION

Consumers have the need for producing photographic prints of different formats. Typically pictures captured on 35 mm film are of 2:3 aspect ratio. In order to produce prints of different aspect ratio, such as 3×5, 5×7, or 8×10 prints, an equal amount of cropping is applied to the two corresponding sides of the image (no cropping on the other two sides) in conventional print fulfillment. This procedure is called "crop to fill". While in general this procedure produces satisfactory prints because photographers tend to frame the picture such that the main subject is in the middle of the picture, it also leads to catastrophic failures such as cropping off a subject's head when the subject's head is located near the top or a side border of the original image. The source of the problem is the lack of scene analysis to understand where the main subject and background are in the image.

Digital photography has created new opportunities as well as new problems. While many digital cameras produce digital images of 2:3 aspect ratio, a significant percentage of other cameras produce images of 3:4 aspect ratio. Because the most popular print format is 4×6, image cropping has to occur when printing digital images of an original aspect ratio of 3:4. A less than satisfactory alternative, called "crop to fit" as opposed to "crop to fill", is to pad the 3:4 image with white space to obtain the desired aspect ratio.

Digital image processing enables a host of new possibilities. One such possibility is automatic scene-dependent image cropping, i.e., cropping undesirable content from a picture and magnifying or zooming the desired content to fill the entire photographic print. Bollman et al. in U.S. Pat. No. 5,978,519 describe a method for cropping images based upon the different intensity levels within the image. With this system, an image to be cropped is scaled down to a grid and divided into non-overlapping blocks. The mean and variance of intensity levels are calculated for each block. Based on the distribution of variances in the blocks, a threshold is selected for the variance. All blocks with a variance higher than the threshold variance are selected as regions of interest. The regions of interest are then cropped to a bounding rectangle. However, such a system is only effective when uncropped images contain regions where intensity levels are uniform and other regions where intensity levels vary considerably. In summary, this technique is only capable of cropping "open" space in the image and cannot deal with images with non-uniform background. Moreover, its cropping precision is also limited by the size of the non-overlapping blocks (i.e., sub-block cropping is not possible). As a result, there is no good way of enforcing a desired aspect ratio during the cropping. Another main drawback of this method is that it does not enforce any picture composition rules.

Another conventional method is employed by on-line print fulfillment service providers such as Ofoto. Assuming that all the pictures have been re-oriented if necessary to the upright orientation by a user upon preview, a somewhat "intelligent" cropping rule is to crop the image based on the so called "20–80" rule, i.e., apply 20% of the needed cropping amount at the top of the image and the remaining 80% at the bottom of the image to ensure that it is very unlikely that a subject's head would be cut off. This option is not possible in a film-based print fulfillment system because the assumption that the image is in the upright orientation is not always valid. In case cropping is needed for the left and right sides of the image (in upright orientation), an equal amount of cropping is applied to each side. Note that in either case, cropping is only applied to two sides of the original picture to maximally retain the content of the original image.

There is therefore a need to provide intelligent image cropping according to an automatic understanding of the image content and enforcement of compositional rules so that (1) the main subject of the image is not cropped in part or in its entirety, (2) both smooth and textured background can be identified and removed in part or in its entirety if necessary, and (3) common picture composition rules such as sufficient headroom can be enforced.

SUMMARY OF THE INVENTION

The present invention is directed to overcoming one or more of the problems set forth above. Briefly summarized, according to one aspect of the present invention, the invention resides in a method for producing a new image of a desired aspect ratio from an original digital image, where the method comprises the steps of: (a) determining a cropping window of the desired aspect ratio and a predetermined size relative to the size of the original digital image; (b) obtaining a main subject belief map including an array of belief values indicating the location and relative importance of subject matter in the original digital image; (c) using the main subject belief map, determining a location of the cropping window in the original digital image that satisfies a predetermined set of criteria; and (d) producing a cropped image of the desired aspect ratio.

The present invention provides a method for image cropping having the advantage of (1) ensuring that the main subject of the image is not cropped in part or in its entirety, (2) identifying and cropping both smooth and textured background if necessary, and (3) enforcing common picture composition rules such as leaving sufficient headroom.

These and other aspects, objects, features and advantages of the present invention will be more clearly understood and appreciated from a review of the following detailed description of the preferred embodiments and appended claims, and by reference to the accompanying drawings.

DESCRIPTION OF THE PREFERRED EMBODIMENT

Because image processing systems employing automatic cropping are well known, the present description will be directed in particular to attributes forming part of, or cooperating more directly with, method in accordance with the present invention. Attributes not specifically shown or described herein may be selected from those known in the art. In the following description, a preferred embodiment of the present invention would ordinarily be implemented as a software program, although those skilled in the art will readily recognize that the equivalent of such software may also be constructed in hardware. Given the method as described according to the invention in the following materials, software not specifically shown, suggested or described herein that is useful for implementation of the invention is conventional and within the ordinary skill in such arts. If the invention is implemented as a computer program, the program may be stored in conventional computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM), or read only memory (ROM); or any other physical device or medium employed to store a computer program.

Figure 1:
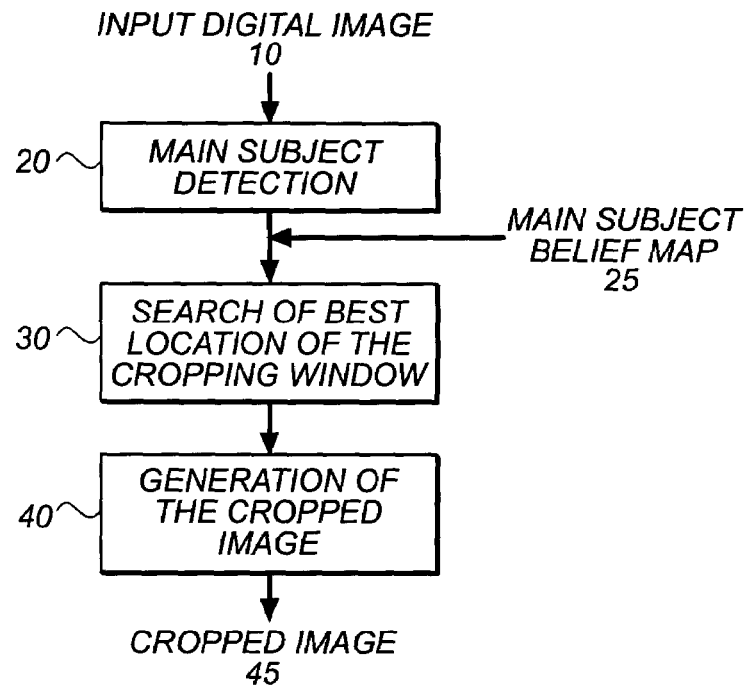
FIG. 1 is a flow chart showing an embodiment of the present invention.
Figure 10:
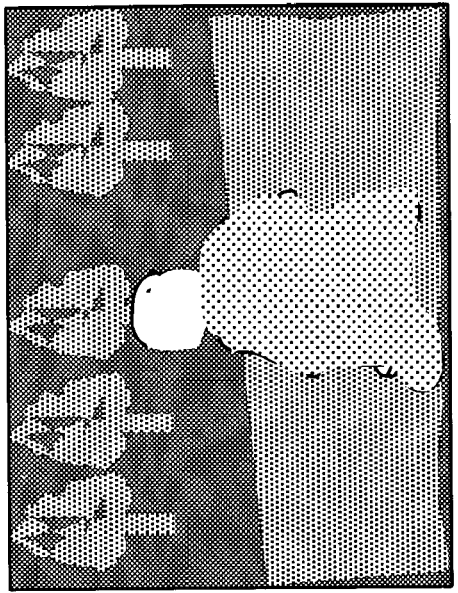
FIG. 10 is an example of a main subject belief map generated from FIG. 9.

Referring to FIG. 1, there is shown a flow chart of an embodiment of the present invention. An original input digital image 10 is first processed by a main subject detection stage 20. The result is a main subject belief map 25 indicating the relative importance and location of the main subject in the image. An example of a main subject belief map is shown in FIG. 10. Guided by the main subject belief map 25, a search 30 is performed to find, by using a set of predetermined image composition rules, the best location of the cropped window, which is of a desired size and aspect ratio. Finally a cropped image 45 is generated in an image cropping stage 40 in response to the best location of the cropping window.

The invention automatically crops digital images according to an analysis of the main subject in the scene. A method for detecting main subjects (e.g., main subject detection or "MSD") in a consumer-type photographic image from the perspective of a third-party observer is described in U.S. Pat. No. 6,282,317 issued Aug. 28, 2001, the disclosure of which is incorporated herein by reference. Main subject detection provides a measure of saliency or relative importance for different regions that are associated with different subjects in an image. Main subject detection enables a discriminative treatment of the scene content for a number of applications related to consumer photographic images, including automatic image cropping.

The MSD system is built upon mostly low-level vision features with semantic information integrated whenever available. This MSD system consists of a number of steps, including region segmentation, feature extraction, and probabilistic semantic reasoning. In particular, a large number of features are extracted for each segmented region in the image to represent a wide variety of visual saliency properties, which are then input into a tunable, extensible probability network to generate a belief map containing a continuum of values.

Using MSD, regions that belong to the main subject are generally differentiated from the background clutter in the image. Thus, automatic image cropping becomes possible. Automatic image cropping is a nontrivial operation that was considered impossible for unconstrained images, which do not necessarily contain uniform background, without a certain amount of scene understanding. In the absence of content-driven cropping, conventional systems have concentrated on simply using a centered cropping scheme or simply removing the uniform background touching the image borders. The centered crop has been found to be unappealing or unacceptable to customers when the main subject is not in the center of the image.

Figure 2:
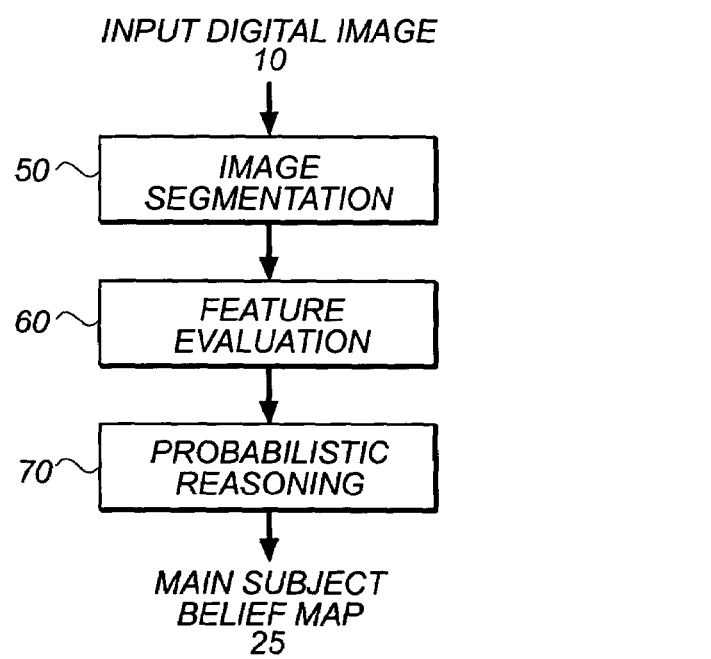
FIG. 2 is a flow chart of the main subject detection process shown in FIG. 1.

Referring to FIG. 2, an input image is segmented in an image segmentation stage 50 into a few regions of homogeneous properties, such as color and texture. The regions are evaluated in a feature evaluation stage 60 for their saliency in terms of two independent but complementary types of features; structural features and semantic features. For example, recognition of human skin or faces is semantic while determination of what stands out generically is categorized as structural. Respecting structural features, a set of low-level vision features and a set of geometric features are extracted. Respecting semantic features, key subject matters frequently seen in photographic pictures are detected. The evidences from both types of features are integrated using a Bayes net-based reasoning engine 70 to yield the final main subject belief map 25. For reference on Bayes nets, see J. Pearl, *Probabilistic Reasoning in Intelligent Systems,* Morgan Kaufmann, San Francisco, Calif., 1988.

One structural feature is centrality. In terms of location, the main subject tends to be located near the center instead of the periphery of the image, therefore, a high degree of centrality is indicative that a region is a main subject of an image. However, centrality does not necessarily mean a region is directly in the center of the image. In fact, professional photographers tend to position the main subject along lines and intersections of lines that divide an image into thirds, the so-called gold-partition positions or rule of thirds.

It should be understood that the centroid of the region alone may not be sufficient to indicate the location of a region with respect to the entire image without any indication of its size and shape of the region. The centrality measure is defined by computing the integral of a probability density function (PDF) over the area of a given region. The PDF is derived from the "ground truth" data, in which the main subject regions are manually outlined and marked by a value of one and the background regions are marked by a value of zero, by summing the ground truth maps over an entire training set. In essence, the PDF represents the distribution of main subjects in terms of location. The centrality measure is devised such that every pixel of a given region, not just the centroid, contributes to the centrality measure of the region to a varying degree depending on its location. The centrality measure is defined as:

$$\text{centrality} = \frac{1}{N_R} \sum_{(x,y) \in R} PDF_{\text{MSD\_Location}}(x, y)$$

where (x,y) denotes a pixel in the region R, $N_R$ is the number of pixels in region R.

If the orientation is unknown, the PDF is symmetric about the center of the image in both vertical and horizontal directions, which results in an orientation-independent centrality measure. The shape of this PDF is such that objects located in the center of an image are more likely to be the main subject. If the orientation is known, the PDF is symmetric about the center of the image in the horizontal direction but not in the vertical direction, which results in an orientation-dependent centrality measure. The shape of this orientation-aware PDF is such that objects located in the bottom portion of an image are more likely to be the main subject.

Another structural feature is borderness. Many background regions tend to contact one or more of the image borders. Therefore, a region that has significant amount of its contour on the image borders is more likely to belong to the background then to the main subject. Two measures are used to characterize the borderness of a region. They include the number of image borders that a region intersects (hereinafter "borderness$_1$") and the percentage of a region's perimeter along the image borders (hereinafter "borderness$_2$").

When orientation is unknown, borderness$_1$ is used to place a given region into one of six categories. This is determined by the number and configuration of image borders that the region is in contact with. A region is in contact with a border when at least one pixel in the region falls within a fixed distance of the border of the image. Distance is expressed as a fraction of the shorter dimension of the image. The six categories for borderness$_1$ are: none, one border, two borders, two facing borders, three or four borders that the region contacts. The more contact that a region has with a border increases the likelihood that the region is not a main subject.

If the image orientation is known, the borderness feature can be redefined to account for the fact that a region that is in contact with the top border is much more likely to be background than a region that is in contact with the bottom border. This results in twelve categories for borderness$_1$ determined by the number and configuration of image borders that the region is in contact with. Using the definition of "in contact with" from above, the four borders of the image are labeled as "Top", "Bottom", "Left", and "Right" according to their position when the image is oriented with objects in the scene standing upright.

The second borderness features, borderness$_2$, is defined as the fraction of the region perimeter that is on the image border. This fraction, intrinsically, cannot exceed one-half, because to do so would mean the region has a negative area, or a portion of the region exists outside the image area, which would be unknown for any arbitrary image. Since such a fraction cannot exceed one-half, the following definition is used to normalize the feature value to a range from zero to one.

Borderness$_2$=2×(number_of_region_perimeter_pixels_on_image_border)/(number_of_region_perimeter_pixels)

One of the semantic features is human skin. According to a study of a photographic image database of over 2000 images, over 70% of the photographic images have people and about the same number of images have sizable faces in them. Thus, skin tones are common in images. Indeed, people are the single most important subject in photographs. Therefore, an algorithm that can effectively detect the presence of skin tones is useful in identifying the main subject of an image. Likewise, an algorithm that can effectively detect the presence of a human face is useful in identifying the main subject of an image.

In the present invention, the skin detection algorithm utilizes color image segmentation and a pre-determined skin distribution in a specific chrominance space, as: P(skin|chrominance). It is known by those skilled in the art that the largest variation between different races is along the luminance direction, and the impact of illumination sources is also primarily in the luminance direction. Thus, if a given region falls within the defined chrominance space, the probabilities are that it is skin, regardless of the level of luminance. For reference see Lee, "Color image quantization based on physics and psychophysics," *Journal of Society of Photographic Science and Technology of Japan*, Vol. 59, No. 1, pp. 212–225, 1996, which is hereby incorporated by reference thereto. The skin region classification is based on maximum probability according to the average color of a segmented region, as to where it falls within the predefined chrominance space. However, the decision as to whether a region is skin or not is primarily a binary one. Utilizing a continuum of skin belief values contradicts, to some extent, the purpose of identifying skin and assigning a higher belief value. To counteract this issue, the skin probabilities are mapped to a belief output via a Sigmoid belief function, which serves as a "soft" thresholding operator. The Sigmoid belief function is understood by those skilled in the art.

Respecting the determination of whether a given region is a main subject or not, the task is to determine the likelihood of a given region in the image being the main subject based on the posterior probability of:

P(main subject detection|feature)

In an illustrative embodiment of the present invention, there is one Bayes net active for each region in the image. Therefore, the probabilistic reasoning is performed on a per region basis (instead of per image).

The output of main subject detection used by the present invention is a list of segmented regions ranked in descending order of the likelihood (or belief) that each is a main subject. This list can be readily converted into a belief map in which each region is located and is assigned a belief value proportional to the main subject belief of the region. Therefore, this map can be called a main subject belief map. An example is shown in FIG. 10, where the different grey values are proportional to the main subject belief of the region. Because of the continuum of belief values employed in the belief map, the belief map is more than a binary map that only indicates location of the determined main subject. The associated likelihood is also attached to each region so that the regions with large values correspond to regions with higher confidence, or belief, that it is part of the main subject.

To some extent, this belief map reflects the inherent uncertainty for humans to perform such a task as MSD because different observers may disagree on certain subject matter while agreeing on other subject matter in terms of main subjects. However, a binary decision, when desired, can be readily obtained by using an appropriate threshold on the belief map. Moreover, the belief information may be very useful for downstream applications. For example, different weighting factors can be assigned to different regions (subject matters) in determining the amount and location of image cropping.

For determination of the location of the cropping window, the present invention uses the main subject belief map instead of a binarized version of the map to avoid making a bad cropping decision that is irreversible. Furthermore, using the continuous values of the main subject beliefs helps trade-off different regions under the constraints encountered in cropping. A binary decision on what to include and what not to include, once made, leaves little room for trade-off. For example, if the main subject region is smaller than the crop window, the only reasonable choice, given a binary main subject map, is to leave equal amounts of margin around the main subject region. On the other hand, secondary main subjects are indicated by lower belief values in the main subject belief map, and can be included according to a descending order of belief values once the main subject of highest belief values is included. Moreover, if an undesirable binary decision on what to include/exclude is made, there is no recourse to correct the mistake. Consequently, the cropping result becomes sensitive to the threshold used to obtain the binary decision. With a continuous-valued main subject belief map, every region or object is associated with a likelihood of being included or a belief value in its being included.

Figure 4:
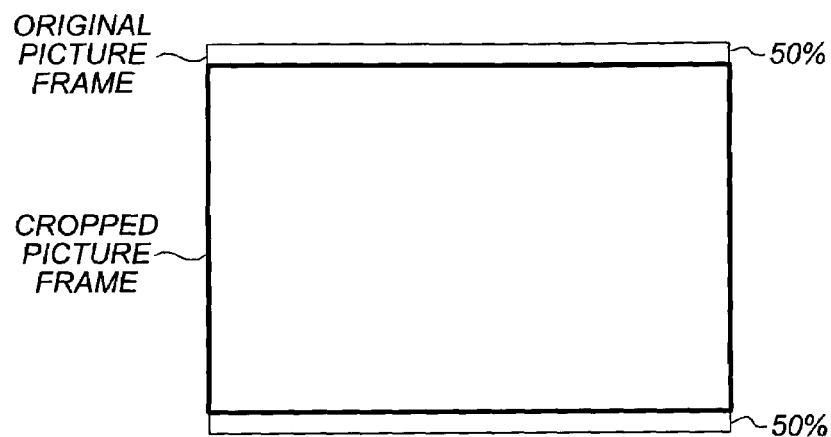
FIG. 4 is a pictorial view of a conventional "crop to fill" method when image orientation is not known.
Figure 5:
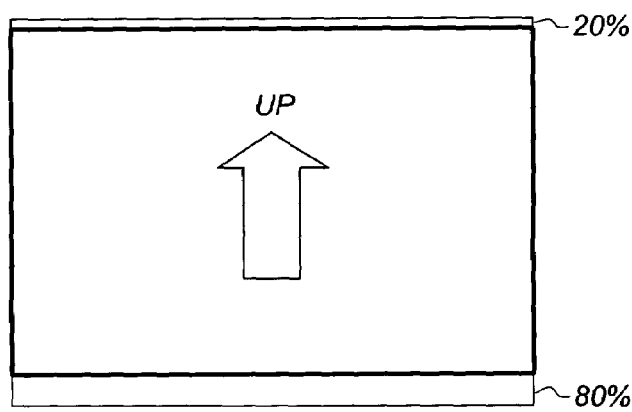
FIG. 5 is a pictorial view of a conventional "crop to fill" method when image orientation is known to be landscape and vertical image cropping is performed.
Figure 6:
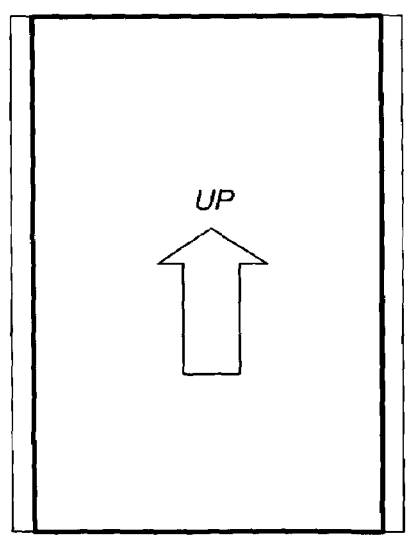
FIG. 6 is a pictorial view of a conventional "crop to fill" method when image orientation is known to be portrait and horizontal image cropping is performed.

A conventional cropping scheme called "crop-to-fill" is illustrated in FIGS. 4 through 6. This scheme is not based on analysis of the content of a given image, but based on the assumption that a subject's head tends to be in the top portion of an image and therefore less cropping should occur at the top of the image to ensure that subject's head is not cropped. When image orientation is not known or an upright orientation cannot be assumed, an equal amount of image cropping is applied to the two image borders (FIG. 4). When image is known to be in the upright orientation, 20% of the needed cropping amount is taken off the top of the image and 80% is taken off the bottom of the image if the original image is in a "landscape" orientation and vertical cropping is needed (FIG. 5); 50% of the needed cropping is taken off both the left and right borders due to the symmetry if the original image is in a "portrait" orientation and horizontal cropping is needed (FIG. 6).

Figure 3:
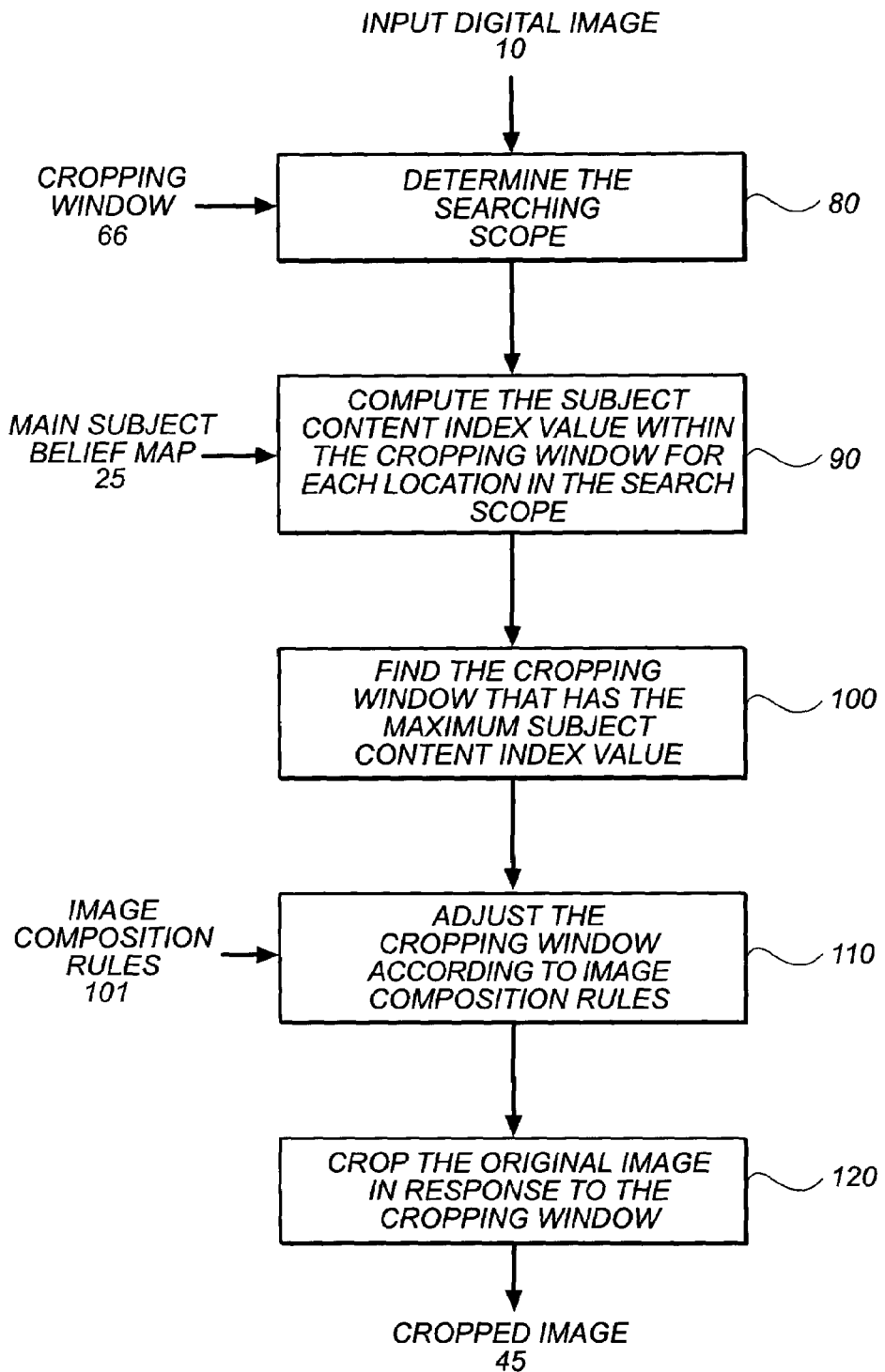
FIG. 3 is a flow chart of the steps of image cropping in the present invention.
Figure 7:
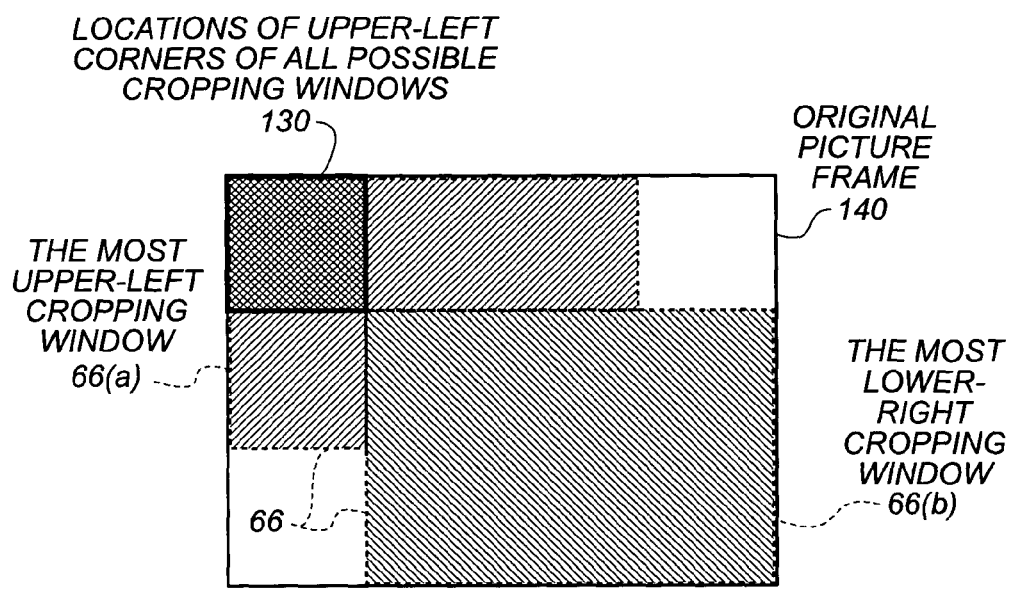
FIG. 7 is a pictorial view of the possible locations for a cropping window.

Referring now to FIG. 3, the method steps for producing an image of a desired aspect ratio is shown according to the invention. After the main subject belief map 25 is created, the method according to the present invention receives a print format as defined by an aspect ratio (e.g. 4×6) and then determines a crop window 66 (as graphically shown in FIG. 7). The print format may be selected by an operator, or by an automatic method based directly on the main subject belief map (e.g., from an estimate of the shape of the main subject). The crop window 66 is a rectangular window with the desired aspect ratio. Referring now to FIG. 7, the search scope for the cropping window is determined in a searching scope determination stage 80. The frame 140 of the original image is shown as the outer most rectangular box. The most upper-left cropping window 66(*a*) and the most lower-right cropping window 66(*b*)—where, for purpose of illustration, window 66(*b*) is shown to overlay part of window 66(*a*)—determine the locations of the upper-left corners 130 of all possible cropping windows, as illustrated by the densely shaded are a within the box of thick boundaries.

It should be noted that the method according to the present invention specifies higher numerical belief values corresponding to higher main subject probability. Therefore, finding a numerical maximum of the sum of the belief values is equivalent to finding an optimum of the subject content index. The sum of beliefs for a cropping window, the subject content index (sci), is computed as follows.

$$sci(w) = \sum_{(x,y) \in w} bel(x, y),$$

where bel(x,y) represents the belief value at a given pixel location (x,y) within the cropping window w.

Recall that the primary subjects are indicated by the highest belief values and the secondary subjects are indicated by belief values lower than those of the primary subjects but higher than those of the background subjects. The goal is to find the crop window that has the highest sum of belief values while ensuring that the primary subjects are completely included in the crop window, i.e., $$\tilde{w} = \max_{w \in W} sci(w),$$

where W denotes the set of all possible crop windows that satisfy all the aforementioned constraints (e.g., those that are completely within the uncropped image and those that encompass the entire primary subjects).

Referring back to FIG. 3, the subject content index value of the cropping window is computed in a subject content computation stage 90 for each location in the search scope. The method according to the present invention first finds the cropping window that has the maximum subject content index value in the maximizing stage 100. Next, the cropping window is adjusted in a window adjustment stage 110 according to a set of predetermined image composition rules 101. Finally, the original image 10 is cropped in a cropping stage 120 in response to the final adjusted cropping window to produce a cropped image 45.

Figure 8:
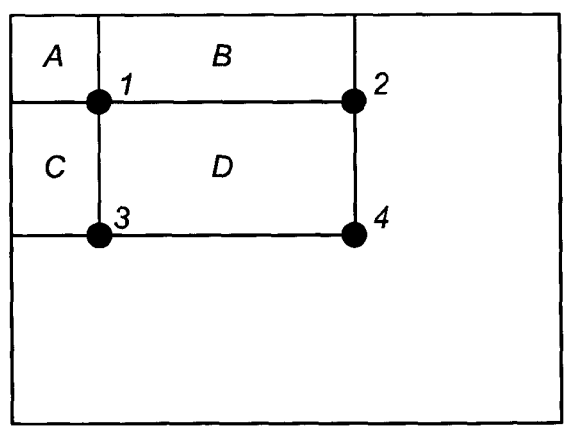
FIG. 8 is a pictorial view of an integral image, which is used to compute the sum of pixels within a rectangular area.

Using a so-called integral image (ii), (for further detail on integral images, see Paul Viola and Michael Jones, "Robust Real-time Object Detection" *Proceedings of ICCV* 2001 *Workshop on Statistical and Computation Theories of Vision*) the subject content index can be computed in a computationally efficient way. Referring to FIG. 8, the sum of pixels within rectangle D can be computed with four array references. The value of the integral image at location 1 is the sum of the pixels in rectangle A, the value at location 2 is A+B, at location 3 is A+C, and at location 4 is A+B+C+D. Therefore, the sum within D can be computed as (4+1)−(2+3). The integral image at location (x,y) contains the sum of the pixels above and to the left of (x,y), inclusive:

$$ii(x, y) = \max_{x' \leq x, y' \leq y} i(x', y')$$

where ii(x,y) is the integral image and i(x,y) is the original image. Using the following pair of recurrences:

$$s(x,y) = s(x,y-1) + I(x,y)$$

$$ii(x,y) = ii(x-1,y) + s(x,y)$$

where s(x,y) is the cumulative row sum, s(x,−1)=0 and ii(−1,y)=0, the integral image can be computed in one pass over the original image. Using an integral image, which only needs to be computed once, the search for the cropping window with the maximum subject content index or sum of main subject belief values can be accomplished extremely quickly.

The present invention utilizes a "k-means" clustering process to determine proper thresholds of MSD beliefs for image cropping. In one preferred embodiment, it is sufficient to use three levels to quantize MSD beliefs, namely "high", "medium", and "low." As would be known by one ordinarily skilled in the art, the present invention is not limited to simply three levels of classification, but instead can utilize a reasonable number of classification levels to reduce the (unnecessary) variation in the belief map. These three levels allow for the main subject (high), the background (low), and an intermediate level (medium) to capture secondary subjects. Therefore, the invention can perform a k-means clustering with k=3 on the MSD belief map to "quantize" the belief values in an image-dependent fashion. Consequently, the belief for each region is replaced by the mean belief of the cluster in that region. (Note that a k-means clustering with k=2 essentially produces a binary map with two clusters, "high" and "low," which is undesirable for cropping based on earlier discussion.)

There are two major advantages in performing such clustering or quantization. First, clustering helps background separation by grouping low-belief background regions together to form a uniformly low-belief (e.g., zero belief) background region. Second, clustering helps remove noise in belief ordering by grouping similar belief levels together. The main purpose of the quantization used here is to provide a threshold for the background and another threshold for the main subject.

The k-means clustering effectively performs a multi-level thresholding operation upon the belief map. After clustering, two thresholds can be determined as follows:

$$threshold_{low} = (C_{low} + C_{medium})/2, \quad threshold_{high} = (C_{medium} + C_{high})/2$$

where $\{C_{low}, C_{medium}, C_{high}\}$ is the set of centroids (average belief values) for the three clusters, and $threshold_{low}$ and $threshold_{high}$ are the low and high thresholds, respectively.

Regions with belief values below the lower threshold are considered "background" and their belief values are set to zero. Regions with belief values above the higher threshold are considered part of the main subject and need to be included in their entirety, whenever possible. Regions with intermediate belief values (e.g., less than or equal to the higher threshold and greater than or equal to the lower threshold) are considered part of the "secondary subject" and will be included as a whole or partially, if possible, to maximize the sum of main subject belief values retained by the crop window. Note that the variance statistics of the three clusters can be used to set the thresholds more accurately to reflect cluster dispersions.

According to the present invention, the k-means process is initialized by finding the maximum value $bel_{maximum}$ and minimum values $bel_{minimum}$ of the belief map, computing the average value $bel_{average}$ of the maximum and minimum values for item in the belief map, and setting the initial centroids (denoted by a superscript of 0) at these three values, i.e., $$C_{low}^0 = bel_{minimum}, C_{medium}^0 = bel_{medium},$$
$$C_{high}^0 = bel_{maximum}$$

Other forms of initialization may apply. For typical MSD belief maps, the k-means process usually converges in fewer than 10 iterations.

Figure 11:
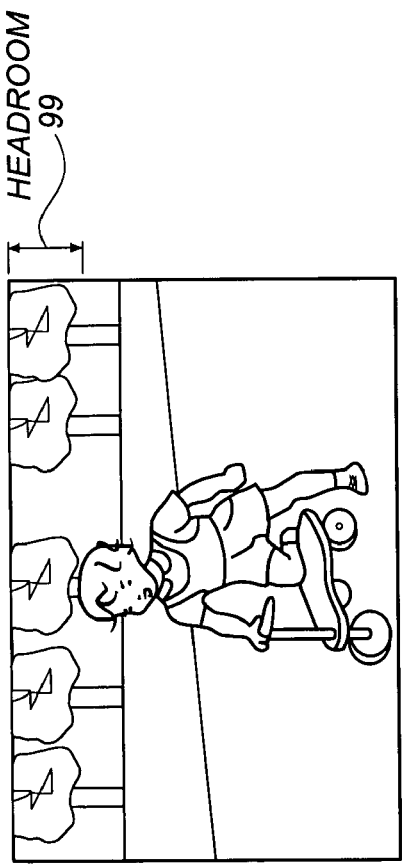
FIG. 11 is an example of a cropped image made from the image of FIG. 9 according to the present invention, showing a desired amount of headroom.

To obtain visually pleasing cropped images, a number of important image composition rules need to be enforced. In a preferred embodiment of the present invention, one of the image composition rules is to maintain the so-called "headroom" such that not only should the top of the main subject (e.g., a person's head) not be cropped but a pre-determined amount of space, e.g., 10% of the size of the main subject, needs to be maintained between the top image border and the top of the main subject. An illustration of the headroom 99 is shown in FIG. 11. A similar image composition rule is to leave a pre-determined minimum amount of open space (e.g., sky or ceiling) at the top of the image to maintain the so-called "breathing room". Open space is defined as a substantially large smooth region and can be found by examining the segmented regions obtained during the main subject detection process according to their edge or gradient content. A region whose maximum gradient in terms of magnitude is below a pre-determined threshold is declared an open space region. An open space detection method is disclosed by Warnick et al. in commonly-assigned U.S. Pat. No. 5,901,245, which is incorporated herein by reference. Another image composition rule is called "center priority", such that if a number of cropping windows have the same subject content index value, the cropping window that is most centered should be selected. Those who are skilled in the art can define and enforce other image composition rules. For example, the rule of thirds can be enforced so that the main subject is positioned roughly at the one-third position along a certain direction.

Figure 12:
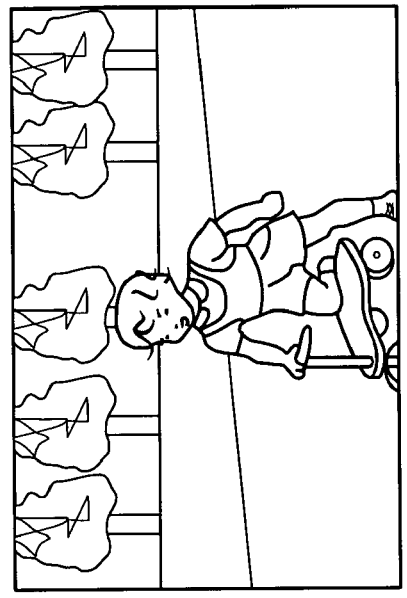
FIG. 12 is an example of a cropped image made from the image of FIG. 9 according to a conventional method.
Figure 9:
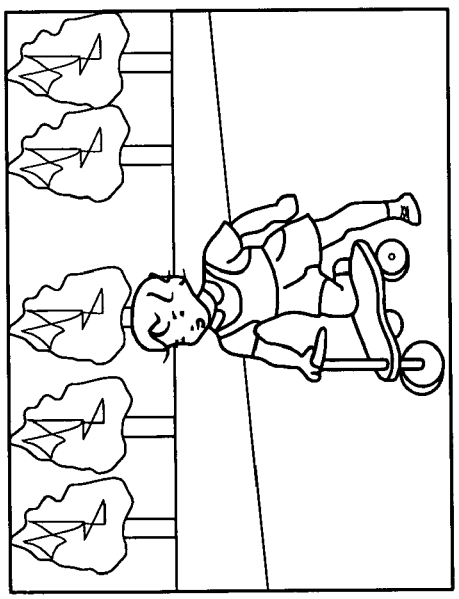
FIG. 9 is an example of an uncropped image.

An example of a consumer photograph and its various cropped versions are shown in FIG. 9, FIG. 11 and FIG. 12. More specifically, FIG. 9 shows an uncropped original photographic image, FIG. 10 illustrates the corresponding main subject belief map (with brighter regions indicating main subjects of higher belief values: the girl's face is the main subject, her body and bike are the secondary main subject, the trees and grass lawn are background), and FIG. 11 is the result of image cropping according to the present invention. For comparison, the result of a cropped image using the "20–80" fixed rule is shown in FIG. 12. Note that a significant portion of the girl's bike is cropped using the "20–80" rule while an excessive amount of the space occupied by the trees is retained. Clearly, the latter result is not as visually pleasing as the result produced by the present invention.

For this example, in the case of the prior art described in the Background section of this application, Bollman et al. (U.S. Pat. No. 5,978,519) would keep the entire image and not be able to produce a cropped image because the background is so cluttered (e.g., trees and grass) that there are no continuous low-activity regions extending from the image borders in this picture.

Figure 13:
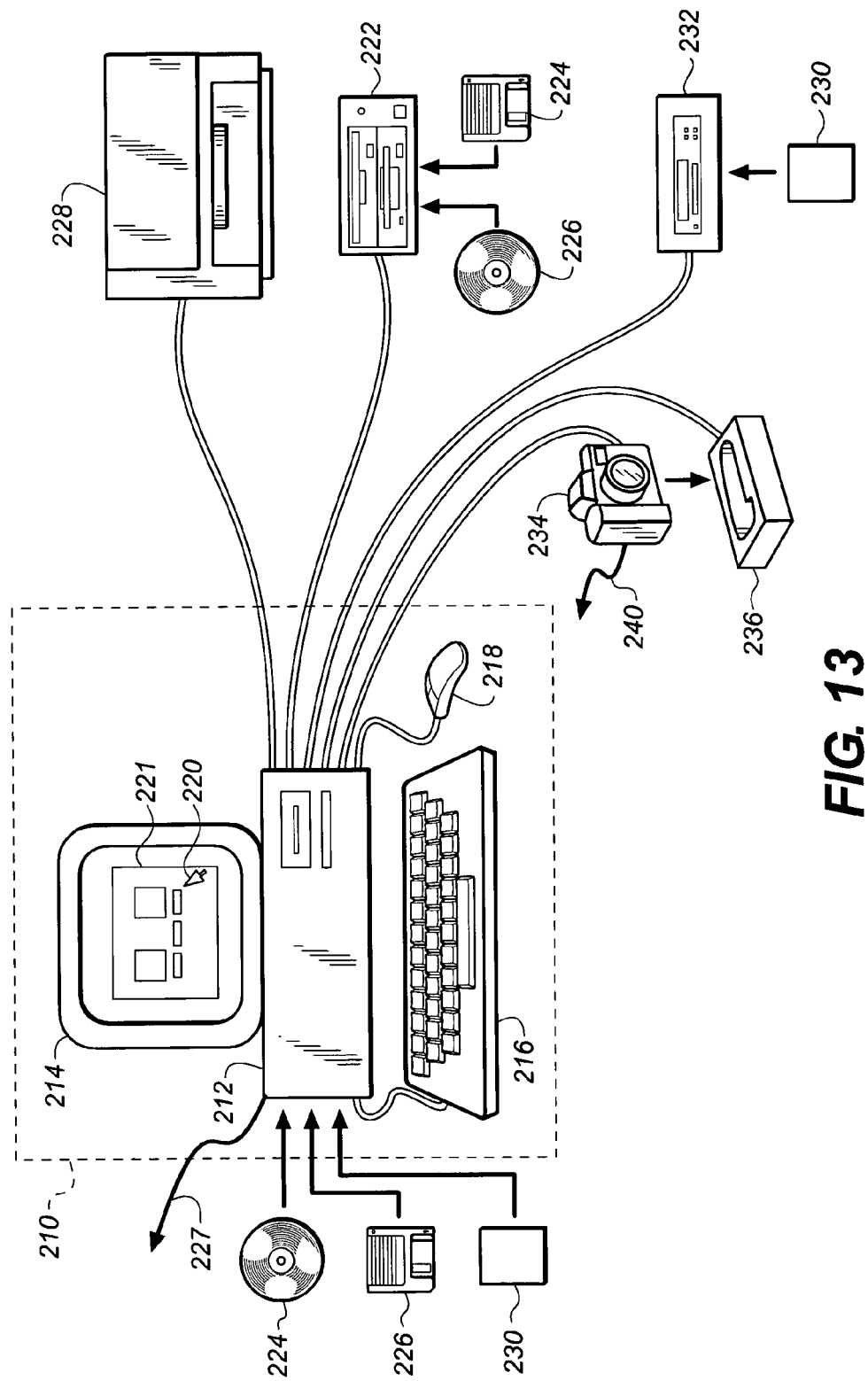
FIG. 13 is schematic diagram of a system embodiment of the invention employing a digital print fulfillment system.

Referring to FIG. 13, there is illustrated a computer system 210 for implementing the present invention in a digital printing environment, such as would be provided by an interactive stand-alone digital photofinishing system, such as a kiosk, or an on-line print fulfilling system, such as the service provided by Ofoto, a Kodak Company. Although the computer system 210 is shown for the purpose of illustrating a preferred embodiment, the present invention is not limited to the computer system 210 shown, but may be used on any electronic processing system such as found in home computers, kiosks, retail or wholesale photofinishing, or any other system for the processing of digital images. The computer system 210 includes a microprocessor-based unit 212 for receiving and processing software programs and for performing other processing functions. A display 214 is electrically connected to the microprocessor-based unit 212 for displaying user-related information associated with the software, e.g., by means of a graphical user interface. A keyboard 216 is also connected to the microprocessor based unit 212 for permitting a user to input information to the software. As an alternative to using the keyboard 216 for input, a mouse 218 may be used for moving a selector 220 on the display 214 and for selecting an item on which the selector 220 overlays, for example an item displayed as part of a graphical user interface 221, as is well known in the art.

A compact disk-read only memory (CD-ROM) 222 is connected to the microprocessor based unit 212 for receiving software programs and for providing a means of inputting the software programs and other information to the microprocessor based unit 212 via a compact disk 224, which typically includes a software program. In addition, a floppy disk 226 may also include a software program, and is inserted into the microprocessor-based unit 212 for inputting the software program. Still further, the microprocessor-based unit 212 may be programmed, as is well known in the art, for storing the software program internally. The microprocessor-based unit 212 may also have a network connection 227, such as a telephone line, to an external network, such as a local area network or the Internet. A printer 228 is connected to the microprocessor-based unit 212 for printing a hardcopy of the output of the computer system 210.

Images may also be displayed on the display 214 via a personal computer card (PC card) 230, such as, as it was formerly known, a PCMCIA card (based on the specifications of the Personal Computer Memory Card International Association) which contains digitized images electronically embodied in the card 230. The PC card 230 is ultimately inserted into the microprocessor based unit 212 for permitting visual display of the image on the display 214. Images may also be input via the compact disk 224, the floppy disk 226, or the network connection 227. Any images stored in the PC card 230, the floppy disk 226 or the compact disk 224, or input through the network connection 227, may have been obtained from a variety of sources, such as a digital camera 234 or a scanner 236 (for example, by scanning an original, such as a silver halide film). The digital camera 234 may also download images to the computer system through a communications link 240 (e.g., an RF or IR link). In accordance with the invention, the algorithm may be stored in any of the storage devices heretofore mentioned and applied to images in order to automatically crop one or more images according to a predetermined aspect ratio and a predetermined set of compositional rules.

Figure 14:
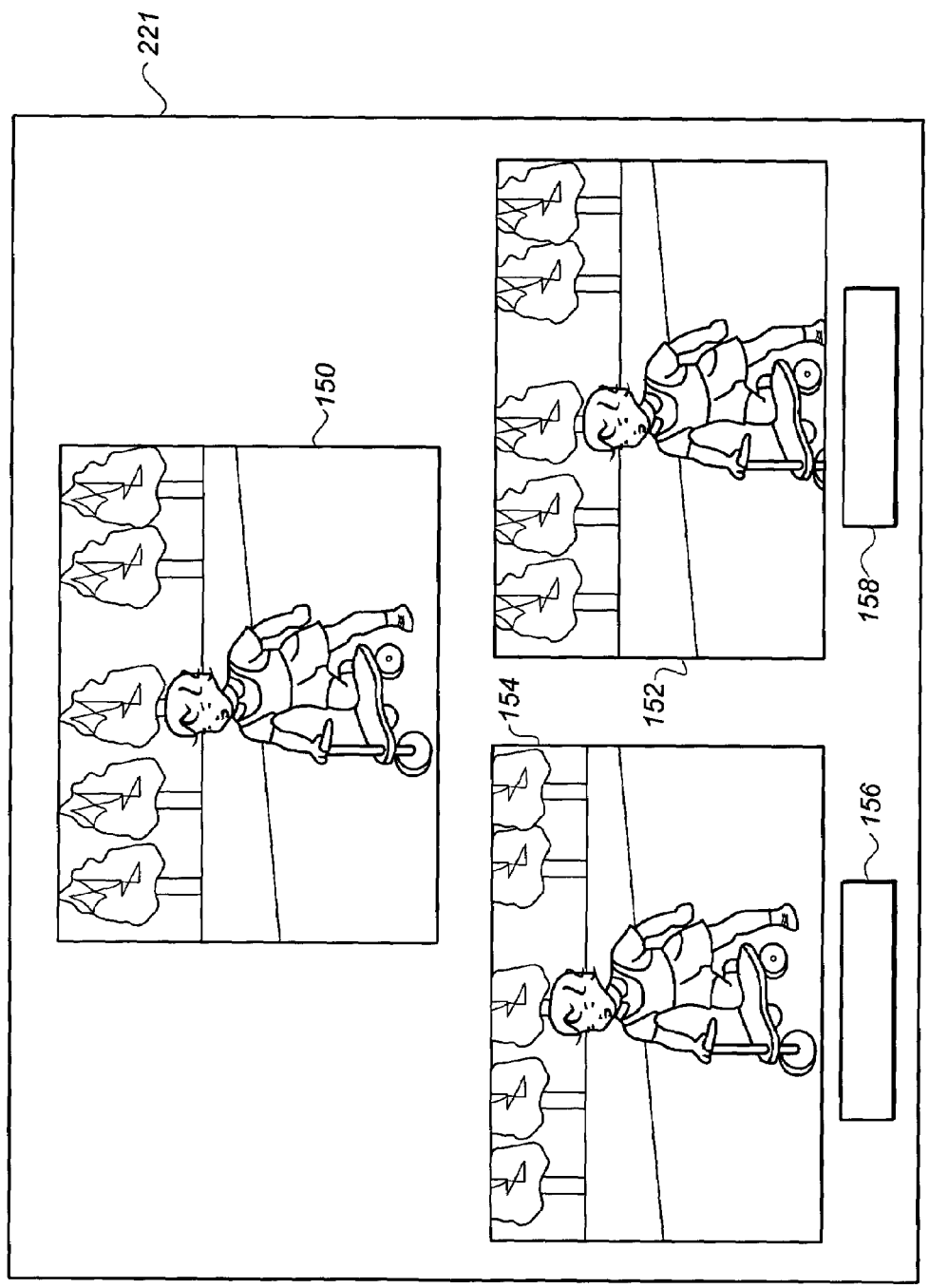
FIG. 14 is a pictorial view of the user interface of the digital print fulfillment system shown in FIG. 13.

Using the graphical user interface 221 as further shown in FIG. 14, a user is presented an original image 150 and a few cropping options with preview images, including the "20–80" cropping 152 and intelligent cropping 154 according to the present invention. A user can click on a button 156, 158 below each preview image and select the cropping he likes. The selected cropping will be applied to the high definition digital image and the cropped image will be sent to the printer to produce a photographic print of the format selected by the user.

Figure 15:
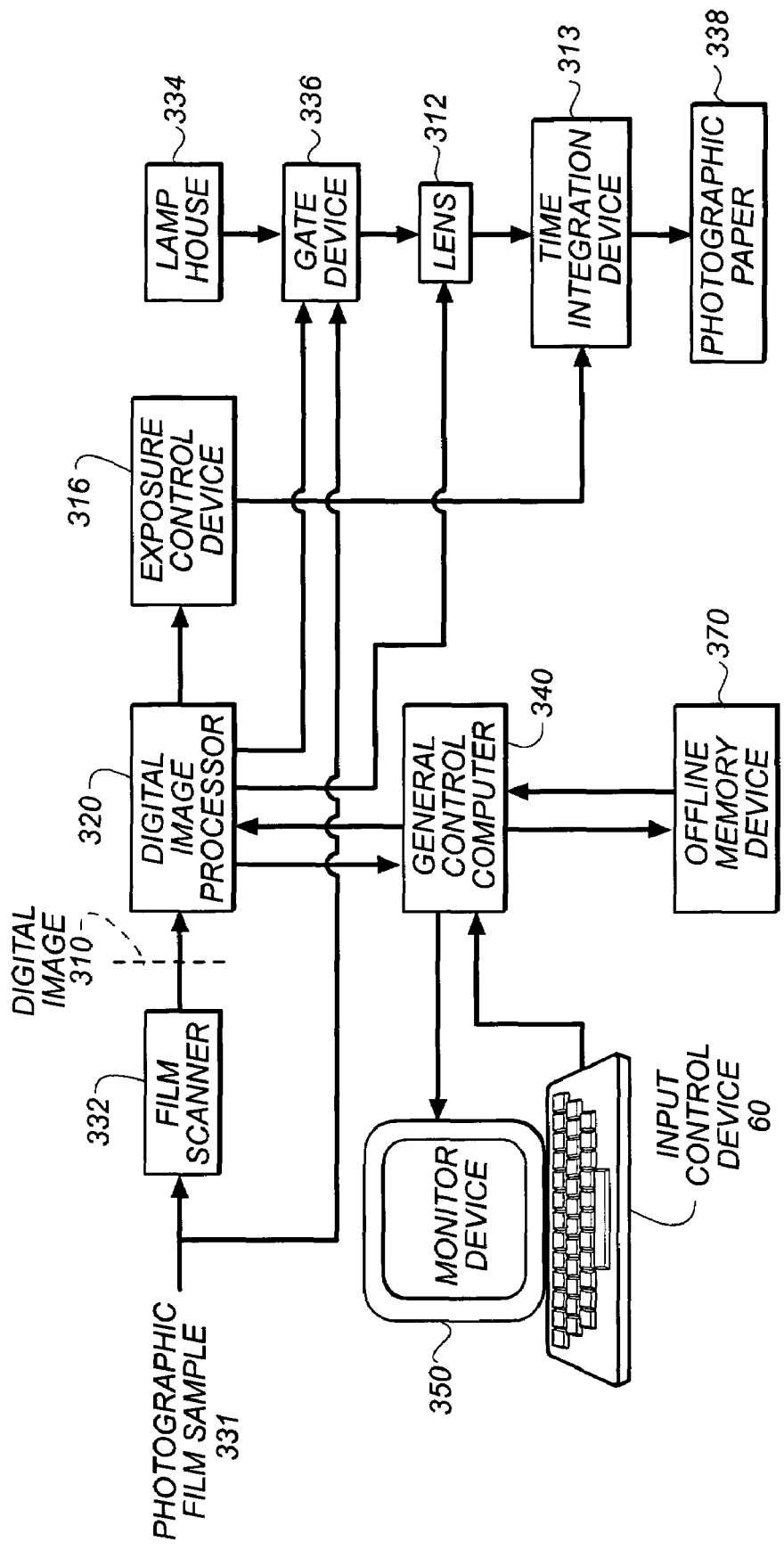
FIG. 15 is a schematic diagram of a system embodiment of the invention employing an optical printing system.

Referring to FIG. 15, there is illustrated a film-based printing system for implementing the present invention, such as would be found in a wholesale digital photofinishing system or in a digital mini-lab photofinishing system. A photographic film sample 331 is received by a film scanner 332 which produces a source digital image 310 relating to the spatial density distribution of the photographic film sample. This source digital image is received by a digital image processor 320. The digital image processor 320 may be connected to a general control computer 340 under operator control from an input control device 360. An offline memory device 370 is connected to the general control computer 340. The monitor device 350 displays diagnostic information about the optical printing system. The general control computer 340 keeps track of the lens magnification setting.

Figure 16:
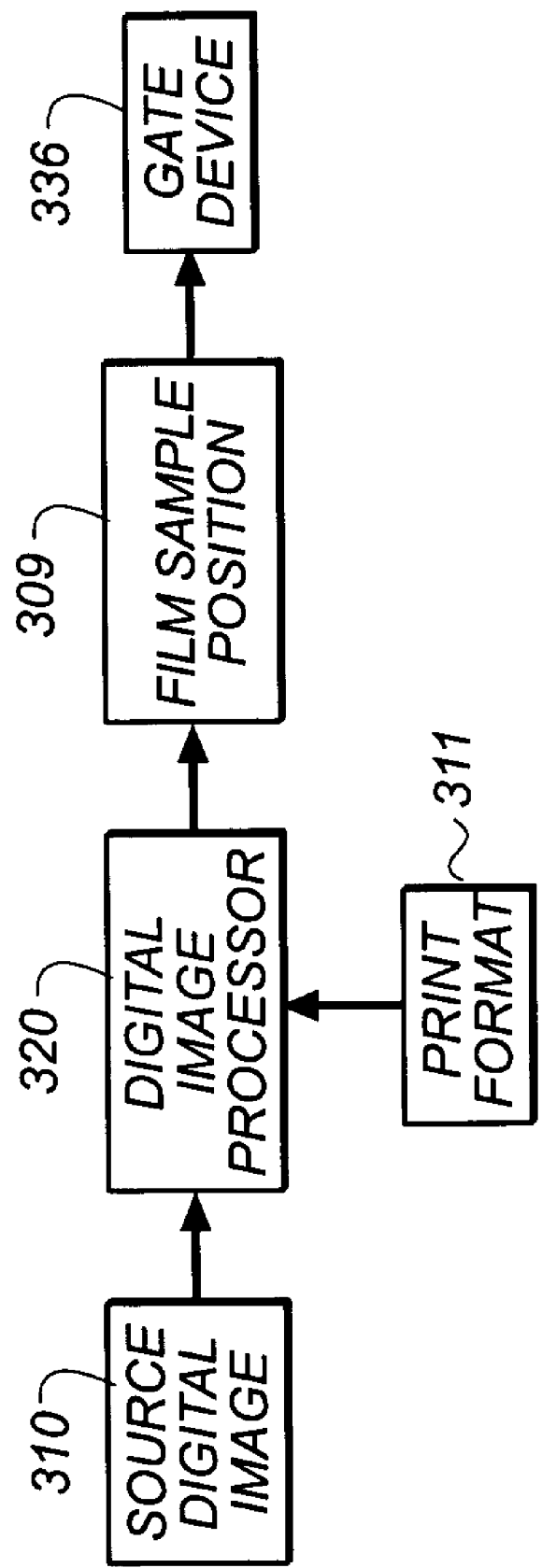
FIG. 16 is a schematic diagram of an adjustment system for calculating a proper position for a film sample in the gate of the optical printing system shown in FIG. 15.

Referring to FIG. 16, a print format 311, which corresponds to the lens magnification setting may also be received by the image processor 320 from the general control computer 340 under operator control. The image processor 320 receives the source digital image 310 and uses the print format 311 and the source digital image 310 to calculate the proper position for the photographic film sample in the form of a film sample position 309. The photographic film sample is positioned in a gate device 336 which holds the film negative in place during the exposure. The gate device 336 receives the film sample position 309 to position the photographic film sample to adjust which portion of the imaging area of the photograph will be printed.

Referring back to FIG. 15, a lamp house 334 provides the illumination source which is transmitted through the photographic film sample 331 and focused by a lens 312 onto photographic paper 338. The time integration device 313 opens and closes a shutter for a variable length of time allowing the focused light from the lamp house 334 to expose the photographic paper 338. The exposure control device 316 receives a brightness balance value from the digital image processor 320. The exposure control device 316 uses the brightness balance value to regulate the length of time the shutter of the time integration device stays open.

The invention has been described with reference to a preferred embodiment. However, it will be appreciated that variations and modifications can be effected by a person of ordinary skill in the art without departing from the scope of the invention.

PARTS LIST 10 original input digital image
20 main subject detection stage
25 main subject belief map
30 search
40 image cropping stage
45 cropped image
50 image segmentation stage
60 feature evaluation stage
66 crop window
66a upper-left cropping window
66b lower-right cropping window
70 reasoning engine
80 searching scope determination stage
90 subject content computation stage
99 headroom
100 maximizing stage
101 image composition rules
110 window adjustment stage
120 cropping stage
130 upper left corner of all possible cropping windows
140 original image frame
150 original image
152 "20–80" cropping
154 intelligent cropping
210 computer system
212 microprocessor-based unit
214 display
216 keyboard
218 mouse
220 selector
221 graphical user interface
222 CD-ROM
224 compact disk
226 floppy disk
227 network connection
228 printer
230 PC card
232 card reader
234 digital camera
236 scanner
240 communications link
309 film sample position
310 source digital image
311 print format
312 lens
313 time integration device
316 exposure control device
320 digital image processor
331 photographic film sample
332 film scanner
334 lamp house
336 gate device
338 photographic paper
340 general control computer
350 monitor device
360 input control device
370 offline memory device

What is claimed is:

1. A method for producing a new image of a desired aspect ratio from an original digital image, said method comprising the steps of:
   (a) determining a cropping window of the desired aspect ratio and a predetermined size relative to the size of the original digital image;
   (b) obtaining a main subject belief map including an array of belief values indicating the location and relative importance of subject matter in the original digital image;
   (c) using the main subject belief map, determining a location of the cropping window in the original digital image that satisfies a predetermined set of criteria; and
   (d) producing a cropped image of the desired aspect ratio.

2. The method as claimed in claim 1, wherein the desired aspect ratio is selected from the group including a 3×5, 4×6, 5×7, and 8×10 aspect ratio.

3. The method as claimed in claim 1, wherein the predetermined size of the cropping window is the largest size allowable by the original digital image.

4. The method as claimed in claim 1, wherein the set of predetermined criteria include a maximum scene content index value, where a scene content index value is defined as the sum of the belief values within the cropping window.

5. The method as claimed in claim 1, wherein the set of predetermined criteria include regions of highest belief values in their entirety.

6. The method as claimed in claim 1, wherein the set of predetermined criteria include maintaining a predetermined amount of space between a top image border of the original digital image and regions of highest main subject belief values.

7. The method as claimed in claim 1, wherein the set of predetermined criteria include retaining a predetermined amount of open space at a top image border of the original digital image.

8. The method as claimed in claim 1, wherein the set of predetermined criteria include assigning a weight in response to a relative location of the cropping window to the center of the original digital image.

9. The method as claimed in claim 1, wherein the step of obtaining a main subject belief map includes the steps of:
   (i) extracting regions of homogenous properties from the original digital image;
   (ii) extracting for each of the regions at least one structural saliency feature and at least one semantic saliency feature; and
   (iii) integrating the structural saliency feature and the semantic saliency feature using a probabilistic reasoning engine to produce an estimate of a belief value that each region is the main subject.

10. The method as claimed in claim 9, wherein step (ii) uses centrality as the structural saliency feature.

11. The method as claimed in claim 9, wherein step (ii) uses borderness as the structural saliency feature.

12. The method as claimed in claim 9, wherein step (ii) uses a presence of human skin tones as the semantic saliency feature.

13. The method as claimed in claim 9, wherein step (ii) uses a presence of human faces as the semantic saliency feature.

14. The method as claimed in claim 9, wherein step (iii) uses a Bayes network as the probabilistic reasoning engine.

15. The method as claimed in claim 4, wherein the step of determining a location of the cropping window includes the steps of:
   (i) computing an integral image from the main subject belief map;
   (ii) computing the subject content index of a cropping window; and
   (iii) selecting a location of the cropping window that produces a maximum subject content index value.

16. The method as claimed in claim 1, wherein the step of determining a location of the cropping window further includes determining a series of all possible locations for the size of the cropping window for a user to choose from.

17. A computer program product for producing a new image of a desired aspect ratio from an original digital image comprising: a computer readable storage medium having a computer program stored thereon for performing the steps of:
  (a) determining a cropping window of the desired aspect ratio and a predetermined size;
  (b) obtaining a main subject belief map including an array of belief values indicating the location and relative importance of subject matter in the original digital image;
  (c) using the main subject belief map, determining a location of the cropping window in the original digital image that satisfies a predetermined set of criteria; and
  (d) producing a cropped image of the desired aspect ratio.

18. The computer program product as claimed in claim 17 wherein the steps (a) through (d) are performed by an on-line print fulfilling system for producing a print of a desired aspect ratio from a digital image.

19. The computer program product as claimed in claim 17 wherein the steps (a) through (d) are performed by a digital mini-lab photo finishing system for producing a print of a desired aspect ratio from a digital image.

20. The computer program product as claimed in claim 17 wherein the steps (a) through (d) are performed by an interactive stand-alone digital photo finishing system for producing a print of a desired aspect ratio from a digital image.

21. The computer program product as claimed in claim 17 wherein the steps (a) through (d) are performed by a wholesale digital photo finishing system for producing a print of a desired aspect ratio from a digital image.

* * * * *